United States Patent
Curcic et al.

(10) Patent No.: US 9,825,819 B2
(45) Date of Patent: *Nov. 21, 2017

(54) CLOUD SERVICE USAGE MONITORING SYSTEM

(71) Applicant: Skyhigh Networks, Inc., Campbell, CA (US)

(72) Inventors: Dejan Curcic, San Jose, CA (US); Sekhar Sarukkai, Cupertino, CA (US); Kaushik Narayan, San Jose, CA (US); Rajiv Gupta, Los Altos, CA (US); Rama Taraniganty, Cupertino, CA (US); Glenn Mulvaney, Cupertino, CA (US)

(73) Assignee: Skyhigh Networks, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/397,581

(22) Filed: Jan. 3, 2017

(65) Prior Publication Data

US 2017/0187580 A1 Jun. 29, 2017

Related U.S. Application Data

(63) Continuation of application No. 14/536,455, filed on Nov. 7, 2014, now Pat. No. 9,571,516.

(60) Provisional application No. 61/902,101, filed on Nov. 8, 2013.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 12/24 | (2006.01) |
| H04L 29/06 | (2006.01) |
| H04L 29/08 | (2006.01) |

(52) U.S. Cl.
CPC .......... *H04L 41/14* (2013.01); *H04L 63/1433* (2013.01); *H04L 67/10* (2013.01); *H04L 67/22* (2013.01)

(58) Field of Classification Search
CPC ..... H04L 41/14; H04L 63/04; H04L 63/0421; H04L 63/1433; H04L 67/10; H04L 67/22
USPC ......................................................... 726/25
See application file for complete search history.

(56) References Cited

U.S. PATENT DOCUMENTS

| | | | |
|---|---|---|---|
| 8,560,413 B1 | 10/2013 | Quarterman et al. | |
| 9,203,847 B2 | 12/2015 | Elleboe | |
| 9,325,735 B1 | 4/2016 | Xie | |
| 2006/0007858 A1 | 1/2006 | Fingerhut | |
| 2008/0307219 A1 | 12/2008 | Karandikar | |
| 2014/0109206 A1 | 4/2014 | Goel et al. | |
| 2014/0259190 A1 | 9/2014 | Kiang | |
| 2016/0036837 A1 | 2/2016 | Jain et al. | |
| 2016/0119365 A1 | 4/2016 | Barel | |
| 2016/0127407 A1 | 5/2016 | Mankovskii et al. | |

OTHER PUBLICATIONS

Chan et al. "Enterprise Risk Management for Cloud Computing", Jun. 2012, 32 pages.

*Primary Examiner* — Dant Shaifer Harriman
(74) *Attorney, Agent, or Firm* — Van Pelt, Yi & James LLP

(57) ABSTRACT

A cloud service usage assessment system analyzes network traffic from an enterprise data network and generates cloud service usage analytics for the enterprise. In some embodiments, the cloud service usage analytics may include cloud service usage risk assessment. The cloud service usage assessment system is advantageous applied to assess network security in view of an enterprise's adoption of multiple cloud based services.

19 Claims, 8 Drawing Sheets

FIG. 6

CLOUD SERVICE USAGE MONITORING SYSTEM

CROSS REFERENCE TO OTHER APPLICATIONS

This application is a continuation of U.S. patent application Ser. No. 14/536,455, entitled CLOUD SERVICE USAGE MONITORING SYSTEM, filed Nov. 7, 2014, now U.S. Pat. No. 9,571,516, issued Feb. 14, 2017, which claims priority to U.S. Provisional Patent Application No. 61/902,101, entitled CLOUD SERVICE USAGE MONITORING SYSTEM, filed Nov. 8, 2013, both of which applications are incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

The primary methods for cloud services risk assessment today is labor intensive based on questionnaire of compliance checklists that each cloud service provider will have to fill out. This manual assessment method has a couple of problems. First, the service provider has to cooperate which is not always possible. Second, this method needs third party validation (typically undertaken by auditors). Finally, the manual assessment method is expensive both in cost and time. There are some standards organizations such as CSA that has a service registry, but they have not identified properties associated with the cloud service via crowd-sourcing, web crawling, experience in using the cloud service, etc. and typically rely on the more traditional questionnaire approach.

BRIEF DESCRIPTION OF THE DRAWINGS

Various embodiments of the invention are disclosed in the following detailed description and the accompanying drawings.

FIG. 6 illustrates a data navigation dashboard with anonymized data fields in some embodiments.

DETAILED DESCRIPTION

Figure 1:
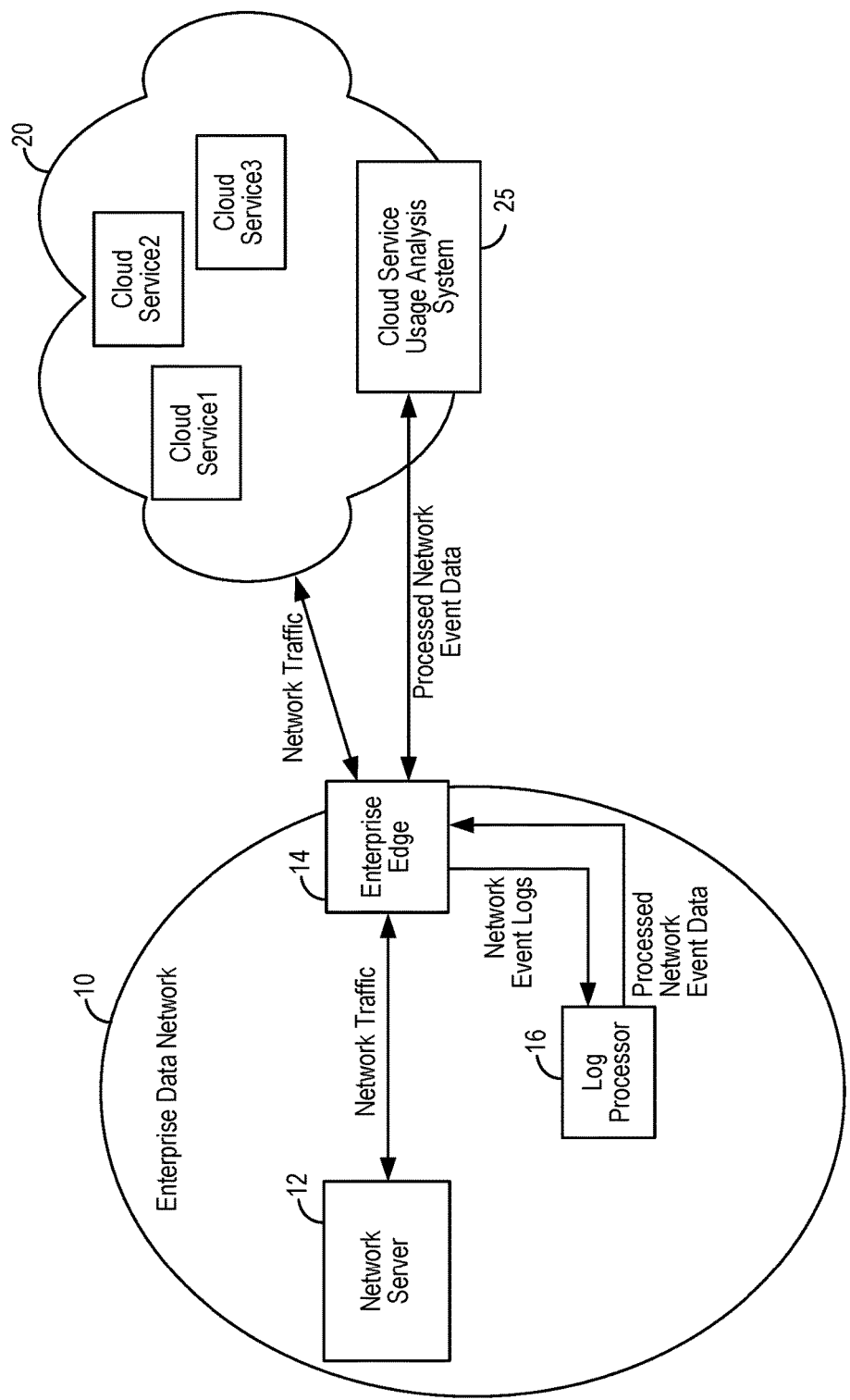
FIG. 1 is a diagram illustrating an environment in which the cloud service usage assessment system of the present invention can be deployed in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud service usage assessment system analyzes network traffic from an enterprise data network and generates cloud service usage analytics for the enterprise. In some embodiments, the cloud service usage analytics may include cloud service usage risk assessment. The cloud service usage assessment system is advantageous applied to assess network security in view of an enterprise's adoption of multiple cloud based services.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network.

In the present description, a proxy server refers to a server, which can be a computer system or a software application, that acts as an intermediary for requests from clients seeking resources from other servers. Furthermore, in the present description, a reverse proxy server refers to a proxy server that retrieves resources on behalf of a client from one or more servers. These resources are returned to the client as though they originated from the proxy server itself.

FIG. 1 is a diagram illustrating an environment in which a cloud service usage assessment system of the present invention can be deployed in some embodiments. Referring to FIG. 1, an enterprise may operate an enterprise data network 10 including one or more network servers 12. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as Cloud Service 1, Cloud Service 2, Cloud Service 3, that are deployed on the public data network 20. Network traffic form the network server 12 travels to the enterprise network edge 14 and then onto the cloud service providers. Network traffic from the cloud service providers are received at the enterprise network edge 14 and then transmitted onto the network server 12.

To ensure network security, the enterprise may deploy the cloud service usage assessment system ("the usage assessment system") of the present invention to monitor and analyze the enterprise's cloud service usage and data traffic to and from the cloud service. In embodiments of the present invention, the cloud service usage assessment system of the present invention is configured to collect network event data and analyzing the network event data to derive analytics for cloud services usage for that enterprise data network. The usage assessment system uses network event data as the input data source and correlates the network event data with cloud service usage to derive the cloud usage analytics.

In some embodiments, the usage assessment system includes a client side component and a cloud-based component. In particular, an on-premises log processor 16 is deployed at the client site, that is, the enterprise data network 10, to receive and process network event logs. The log processor 16 generates processed network event data which is transmitted from the enterprise data network 10 to an off-premises cloud service usage analysis system 25. In one embodiment, the cloud service usage analysis system 25 is a cloud-based service and may be accessed through a publicly accessible data network, such as the Internet, or a private data network, such as a third party private data network. As thus configured, the enterprise data network 10 may deploy the cloud service usage assessment system of the present invention by installing only the log processor 16 on the premises of the enterprise. The processed event data is shipped out of the enterprise data network (off premises) to be processed by the cloud service usage analysis system 25 to derive the cloud usage analytics. In this manner, the enterprise avoids the need to maintain hardware and systems on premises to provide cloud usage analysis.

In some examples, the usage assessment system generates cloud usage analytics including, but not limited to, information relating to identification of cloud service providers being used, identities of users using each of the identified cloud service providers, times of usage, the volume of transactions, and the service category of the cloud service providers. In some examples, the usage assessment system further provides risk assessments for the enterprise's use of one or more of the cloud service providers. In some examples, the identifiers and other private information related to users or the enterprise may be anonymized, as will be discussed in more detail below.

More specifically, the log processor 16 receives network event logs from the enterprise network edge 14. Network event logs are generated based on the network traffic. For a typical data network, a large amount of event logs are generated at a high rate as network traffic travels through the enterprise network edge 14 between users and the public data network 20. The large volume and the high rate of network event logs make it impractical to transmit the entirety of the network event logs off-premises for processing. Furthermore, not all network traffic being logged is relevant to cloud usage analysis. Accordingly, in embodiments of the present invention, the cloud service usage assessment system employs the log processor 16 which is deployed on the premises of the enterprise data network 10. The log processor 16 processes the network event logs generated by the enterprise network edge 14 to generate the processed network event data. The log processor 16 processes the network event logs by filtering the network event data to isolate events that are relevant to cloud services usage. Furthermore, there is a concern for the enterprise's privacy and confidentiality when the enterprise's network event data is transmitted off-premises for further analysis. Accordingly, the log processor 16 anonymizes the network event data, that is, the log processor 16 remove identifying particulars from the network event data, so that the enterprise is ensured of a high level of privacy.

Figure 2:
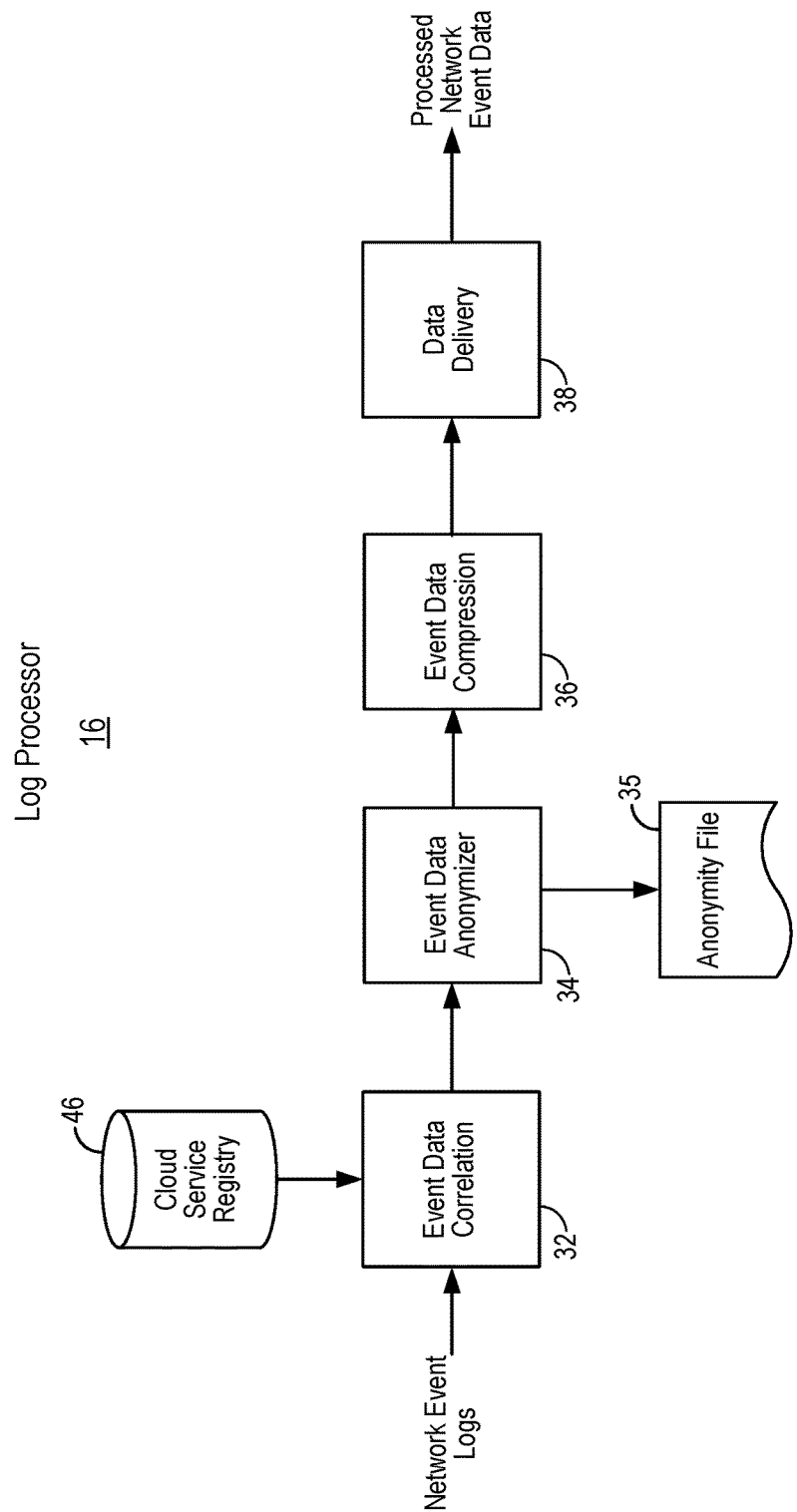
FIG. 2 is a block diagram of a log processor which can be deployed on the premises of an enterprise data network according to some embodiments of the present invention.

FIG. 2 is a block diagram of a log processor which can be deployed on the premises of an enterprise data network according to some embodiments of the present invention. Referring to FIG. 2, a log processor 16 receives network event logs as the input data source. The network event logs contain network event data describing network events traveling to and from the enterprise data network. In the present description, network event data for a network event is described by the source indicator (the IP address of the source or the user), the destination indicator (the IP address of the destination or the user), the time of the event, and other request parameters. In the present embodiment, the log processor 16 implements four processing functions: correlation, tokenization, compression and event delivery.

First, at the log processor 16, the received network event logs are provided to an event data correlation engine 32. The event data correlation engine 32 also receives input data from a cloud service registry 46. The cloud service registry 46 is a database containing a registry of information or attributes associated with various cloud service providers. The cloud service registry database may be part of the cloud services usage assessment system and may be deployed on the public data network 20 and is accessible by both the cloud service usage analysis system 25 and the log processor 16. In some cases, the log processor 16 obtains the data stored on the cloud service registry 46 through the cloud service usage analysis system 25.

With the cloud service registry data thus available, the event data correlation engine 32 analyzes and filters the network event logs to identify network events related to cloud services. For example, the event data correlation engine 32 may correlate out-bound network data traffic to specific cloud service providers by examining the destination IP (Internet Protocol) addresses or the URL. The event data correlation engine 32 drops or removes event data that are not related to cloud services. The event data correlation engine 32 generates filtered event data that are related to cloud service usage. In one embodiment, the event data correlation engine 32 retains network event data that correlates to a cloud service provider identified in the cloud service registry and drops network event data that does not correlate to any cloud service provider in the registry. By reducing the volume of event data that has to be transmitted off-premises, the log processor enables the effective use of an off-premises analysis engine to analyze the network event data. Using an off-premises analysis engine reduces the implementation complexity of the usage assessment system and also provides ease of scalability when the network traffic increases at the enterprise.

The filtered event data is then provided to an event data anonymizer engine 34 to mask out sensitive identifying information in the filtered event data. To ensure privacy of the enterprise's data, the event data anonymizer engine 34 anonymizes or tokenizes identifying information about the enterprise and its users. In one embodiment, the identifying particulars in the network event data are removed and replaced by randomly generated alphanumeric character strings. In other words, the identifying information in a piece of the network event data is masked by a random identifier. In this manner, the event data anonymizer engine 34 disguises sensitive identifying information or user identity information. By performing the tokenization on-premises, the tokenization algorithm does not have to leave the enterprise's data network and thus privacy is ensured.

In embodiments of the present invention, the event data anonymizer 34 generates an anonymity file 35 as a result of the tokenization process. The anonymity file contains a mapping of the identifying information and the corresponding random identifier. The anonymity file is retained on the premises of the enterprise to ensure maximum privacy. In some embodiments, the anonymity file is used to allow the user of the enterprise data network to view the cloud usage analytics with the identifying information unmasked, as will be explained in more detail below.

The event data anonymizer 34 generates filtered tokenized network event data which is then provided to an event data compression engine 36. Event data compression engine 36 applies one or more compression algorithm to compress the event data. The compressed event data is provided to a data delivery engine 38 which packages the compressed and filtered network event data for transmission to the cloud services usage analysis system 25 over the data network 20.

Figure 3:
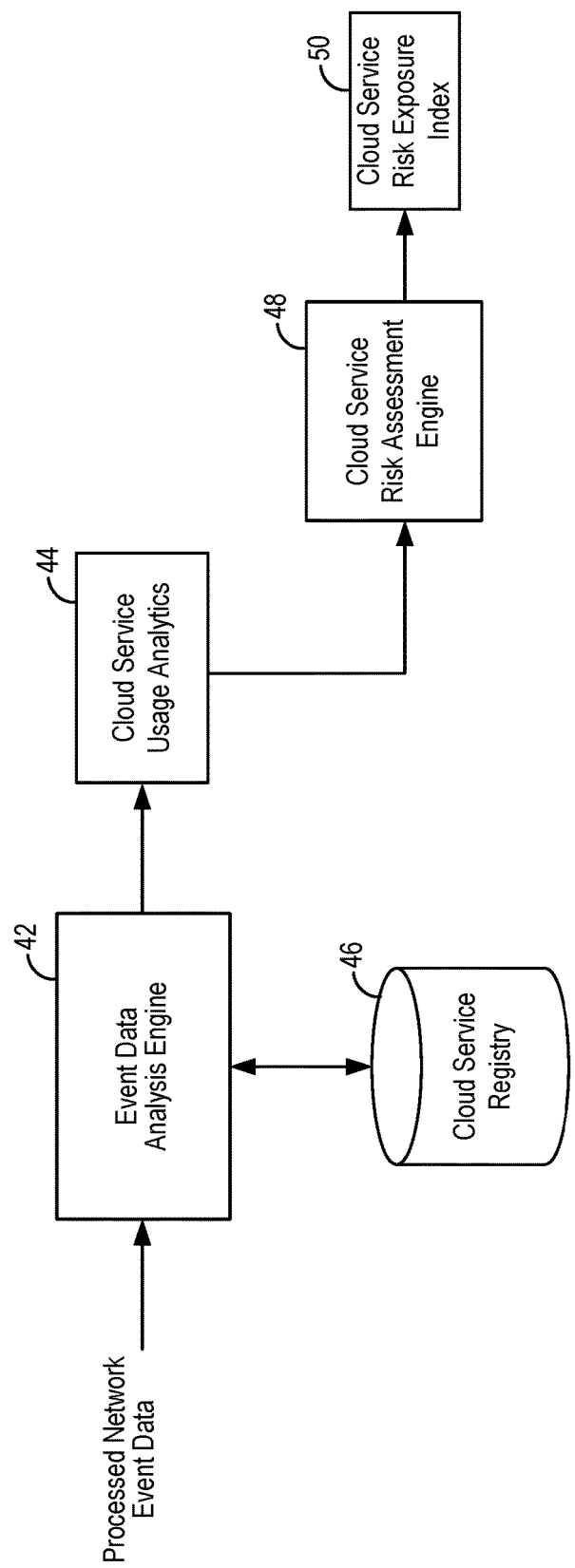
FIG. 3 is a block diagram of a cloud service usage analysis engine which can be deployed off the premises of an enterprise data network according to some embodiments of the present invention.

FIG. 3 is a block diagram of a cloud service usage analysis system deployed off the premises of an enterprise data network as part of the cloud service usage assessment system according to some embodiments of the present invention. In some embodiments, the cloud service usage analysis system 25 ("usage analysis system") is deployed on a public accessible data network, such as the Internet. In other embodiments, the usage analysis system 25 may be deployed on a third party private data network. The usage analysis system 25 receives processed network event data from the on-premises log processor that was transmitted over the data network. The processed event data is provided to an event data analysis engine 42. The event data analysis engine 42 is also in communication with the cloud service registry 46 which is the data base storing attributes of one or more cloud service providers, as described above. The event data analysis engine 42 analyzes the incoming network event data to generate one or more cloud service usage analytics 44.

In some embodiments, the event data analysis engine 42 operates to correlate the network event data to unique users identified by the random identifier. The event data analysis engine 42 also correlates the network event data to cloud service providers, such as the cloud service providers identified in the cloud service registry 46. In other embodiments, the event data analysis engine 42 also performs analysis to detect anomaly in the network event data. For example, the event data analysis engine 42 may detect for unusual activities of a user, or a certain usage pattern, or a large amount of data download by a user. The event data analysis engine 42 analyzes the network event data to generate one or more cloud service usage analytics 44. As described above, the cloud service usage analytics 44 can include, but not limited to, information relating to identification of cloud service providers being used, the users using each of the identified cloud service providers, time of usage and volume of transactions, and the service category of the cloud service providers. The service categories of the cloud service provides relate to the types of services provided by the providers, including social media, cloud storage, content sharing, web application API, collaboration, marking and others.

Figure 5:
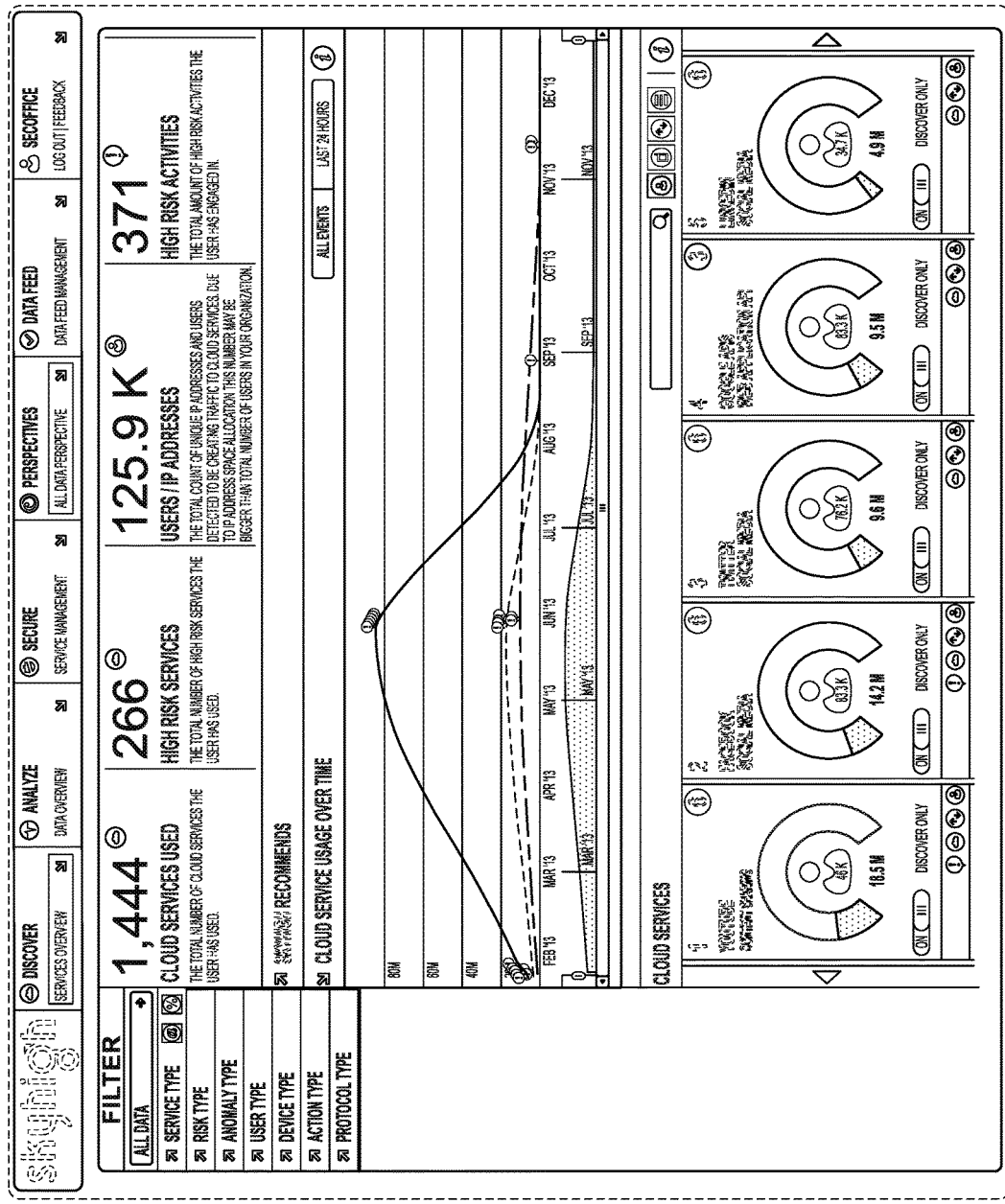
FIG. 5 is an example user interface which may be used to display the usage analytics to a user of the enterprise.

For example, in some embodiments, the usage analytics 44 may provide information relating to the detected number of cloud service providers being used, the detected number of high risk service providers being used, the detected number of users or unique IP addresses using each cloud service, and the detected volume of high risk activities that users of the enterprise may be engaged in. As further examples, the usage analytics 44 may include the cloud service usage (in terms of date volume) over time, and the ranking of cloud service providers based on cloud service usage volume. FIG. 5 is an example user interface which may be used to display the usage analytics 44 to a user of the enterprise.

In embodiments of the present invention, the usage analysis system 25 further includes a cloud service risk assessment engine 48 configured to generate one or more cloud service risk exposure index 50 based on the cloud service providers detected in the event data as being used by the enterprise. The cloud service risk exposure index 50 may be computed based on one or more risk attributes associated the cloud service provider. Examples of computation of cloud service risk exposure index are described in U.S. patent application Ser. No. 14/166,721, which application is incorporated herein by reference in its entirety.

In some embodiments, the cloud service risk assessment engine 48 may generate a set of risk exposure metrics associated with the enterprise's use of certain cloud services. The cloud service usage risk exposure index 50 may be generated by evaluating the set of risk exposure metrics. For example, the risk assessment engine 48 may evaluate risk exposure metrics associated with the types of cloud services the enterprise is using, such as whether the cloud service providers are high risk providers or low risk providers or the types of services (e.g. social media or storage). The risk assessment engine 48 may further evaluate risk exposure metrics associated with the volume of data being communicated to and from the cloud service providers, such as whether the volume is normal or larger than normal. The risk assessment engine 48 may further evaluate risk exposure metrics associated with the directionality of the data, such as the volume of data being uploaded versus downloaded. The risk assessment engine 48 may further evaluate risk exposure metrics associated with the status of the cloud service, such as whether the enterprise block or allow the cloud service provider.

As thus configured, the cloud service usage assessment system, including the on-premises log processor and the off-premises cloud service usage analysis system, is applied to monitor and analyze the network traffic for an enterprise and to provide the enterprise insight into the cloud service usage pattern.

Figure 4:
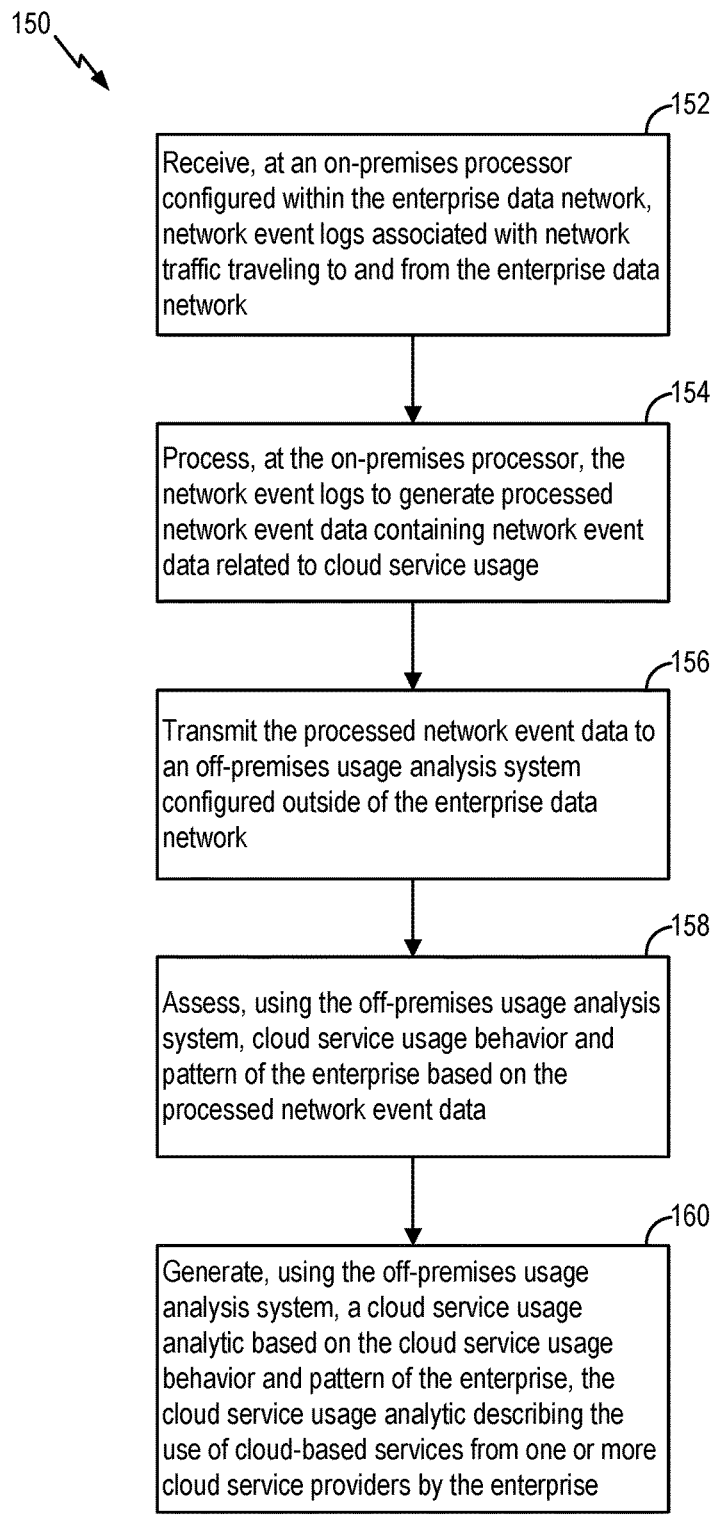
FIG. 4 is a flowchart illustrating cloud service usage assessment method according to embodiments of the present invention.

FIG. 4 is a flowchart illustrating cloud service usage assessment method according to embodiments of the present invention. Referring to FIG. 4, a cloud service usage assessment method 150 starts with receiving, at an on-premises processor configured within the enterprise data network, network event logs associated with network traffic traveling to and from the enterprise data network (152). The method 150 continues with processing, at the on-premises processor, the network event logs to generate processed network event data containing network event data related to cloud service usage (154). The method 150 then continues with transmitting the processed network event data to an off-premises usage analysis system configured outside of the enterprise data network (156). The method 150 continues with assessing, using the off-premises usage analysis system, cloud service usage behavior and pattern of the enterprise based on the processed network event data (158). The method 150 then concludes with generating, using the off-premises usage analysis system, a cloud service usage analytic based on the cloud service usage behavior and pattern of the enterprise where the cloud service usage analytic describes the use of cloud-based services from one or more cloud service providers by the enterprise (160).

Data Navigation Dashboard

In some embodiments, a user of the enterprise may access the processed network event data, cloud usage analytics and risk exposure index information using a dashboard. FIG. 5 illustrates a user interface for implementing a data navigation dashboard in some embodiments. In one example, the dashboard is a website associated with the cloud service usage assessment system. Furthermore, in some embodiments, the dashboard provides faceted data navigation to enable the user to filter and select network event data for view and also to filter and select cloud usage data and analytics for view in a useful and user-friendly manner. In some embodiments, a facet map is provided to enable cross-reference of network events based on various attributes, including cloud service type, user device type, anomaly detected, action type, and risk assessment of cloud infrastructure. In one embodiment, the dashboard uses a motion graph to illustrate usage trend.

Furthermore, in some examples, the dashboard may be used to provide recommendation to the user for controlling cloud usage, such as for security purposes. For example, in some instances, the dashboard can be configured to generate a script which the user can install on the enterprise's network device to block a particular cloud service.

Display Unmasked Anonymized Data

Figure 6:
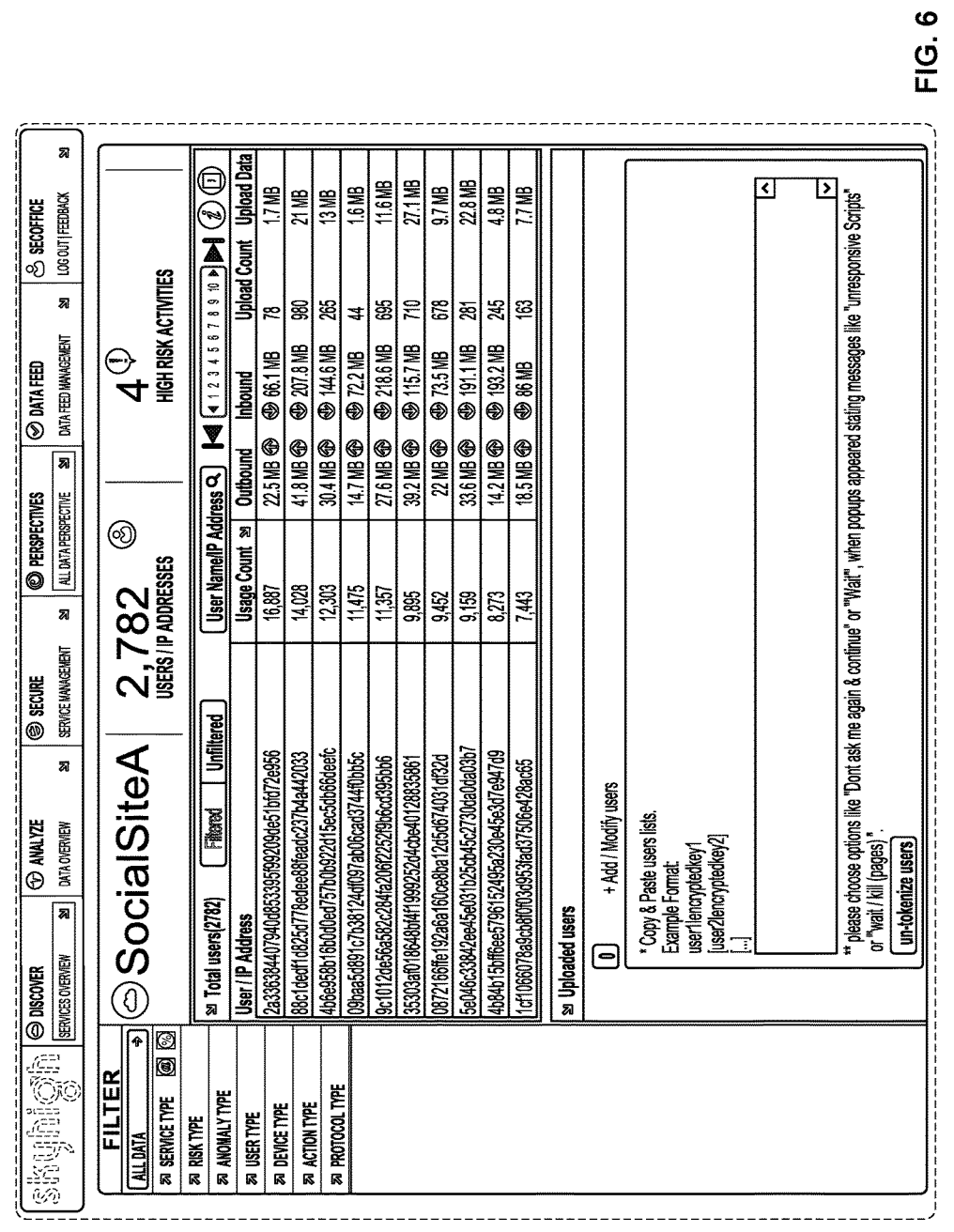

In embodiments of the present invention, the data navigation dashboard displays processed network event data that contains anonymized date fields, as shown in FIG. 6. FIG. 6 illustrates a data navigation dashboard with anonymized data fields in some embodiments. Referring to FIG. 6, when a user of the enterprise, such as an administrator, views the processed network event data and the cloud usage analytics on the data navigation dashboard, the user names/IP addresses or the physical locations of various users may be masked by random identifiers to protect the privacy of the individuals in the enterprise. When the administrator of the enterprise wishes to use the data navigation dashboard to review the cloud usage analytics, the administrator would be presented with the anonymized data, as shown in FIG. 6. However, administrator from the enterprise may wish to review the cloud usage data with the specific identifying information displayed.

According to one aspect of the present invention, a method enables the display of unmasked anonymized data on a data navigation dashboard displayed using a web browser. In some embodiments, a user uses a browser to access a website that displays data where at least a portion of the data has been anonymized or tokenized. For example, the website can be the data navigation dashboard for displaying cloud usage data associated with an enterprise, as shown in FIG. 6. As described above, the log processor 16 of the usage assessment system generates an anonymity file 35 containing a mapping of masked identifying information to random identifiers. More specifically, the tokenization process at the log processor 16 generates an anonymity file that contains a mapping of identifying information in the processed event network logs to be masked and the corresponding random identifier.

In embodiments of the present invention, the method unmasks the anonymized data displayed on a web browser using mapping data stored locally in the web page within the web browser. To unmask the anonymized data being displayed on the web browser, the anonymity file is uploaded into the web browser and the anonymity file is stored locally within the user's web browser using web storage. In the present description, web storage refers to web application software methods and protocols used for storing data in a web browser. In one embodiment, the anonymity file is stored in the browser using HTML local storage, such as HTML5 web storage. A client-side software component accesses the anonymity file and replaces the anonymized data on the webpage with the actual, unmasked information. For example, the enterprise's users' identifying information, such as the users' names and physical locations, may be unmasked. The rendering of the user specific data is only on the browser side and the user specific data does not leave the enterprise's data network. In the example shown in FIG. 6, the anonymity file 35 may be uploaded by selecting the function "Un-tokenize users" in the "Uploaded Users" pane.

In other embodiments, the method uploads the anonymity file by copying and pasting the mapping values for the anonymized data from the anonymity file into a data input area of the browser, such as in the "Uploaded Users" pane in FIG. 6. In another embodiment, the anonymity file is uploaded to the browser by providing a pointer to the anonymity file. Furthermore, in some embodiments, a server in the enterprise's data network can be configured to serve the anonymity file to the browser to enable the mapping values to be loaded into the web browser.

Dynamic IP Address Classification

As described above, the log processor that is on-premises at the enterprise data network performs correlation and filtering of the network event logs. In particular, the log processor is configured to filter the event logs to isolate network events related to cloud services. For instance, the log processor may correlate the out-bound network data traffic to specific cloud service providers by examining the destination IP (Internet Protocol) addresses or the URL. The IP address or URL may be matched to known cloud service providers in the cloud service registry. However, in some cases, cloud service providers, such as IaaS (Infrastructure as a Service) providers, may use dynamic IP addresses. Other cloud service providers may employ remote computing services, such as web services or cloud computing services, offered by a third party and accessible over the Internet. The use of dynamic IP addresses impairs the log processor's ability to correlate and filter the network event data as it is not possible to determine the true destination of the network traffic based on IP addresses in the network event logs.

In embodiments of the present invention, a dynamic IP address classification method enables discovery and classification of network traffic destined to cloud service providers that use dynamic IP addresses. The dynamic IP address classification method is configured to discover and collect all IP addresses destined to cloud-based providers. The method is further configured to scan and classify the IP addresses. In some embodiments, the dynamic IP address classification method is implemented in the log processor of the cloud service usage assessment system. The log processor receives the network event logs of the enterprise and implements the dynamic IP address classification method to scan and classify the IP addresses of cloud service providers.

Figure 7:
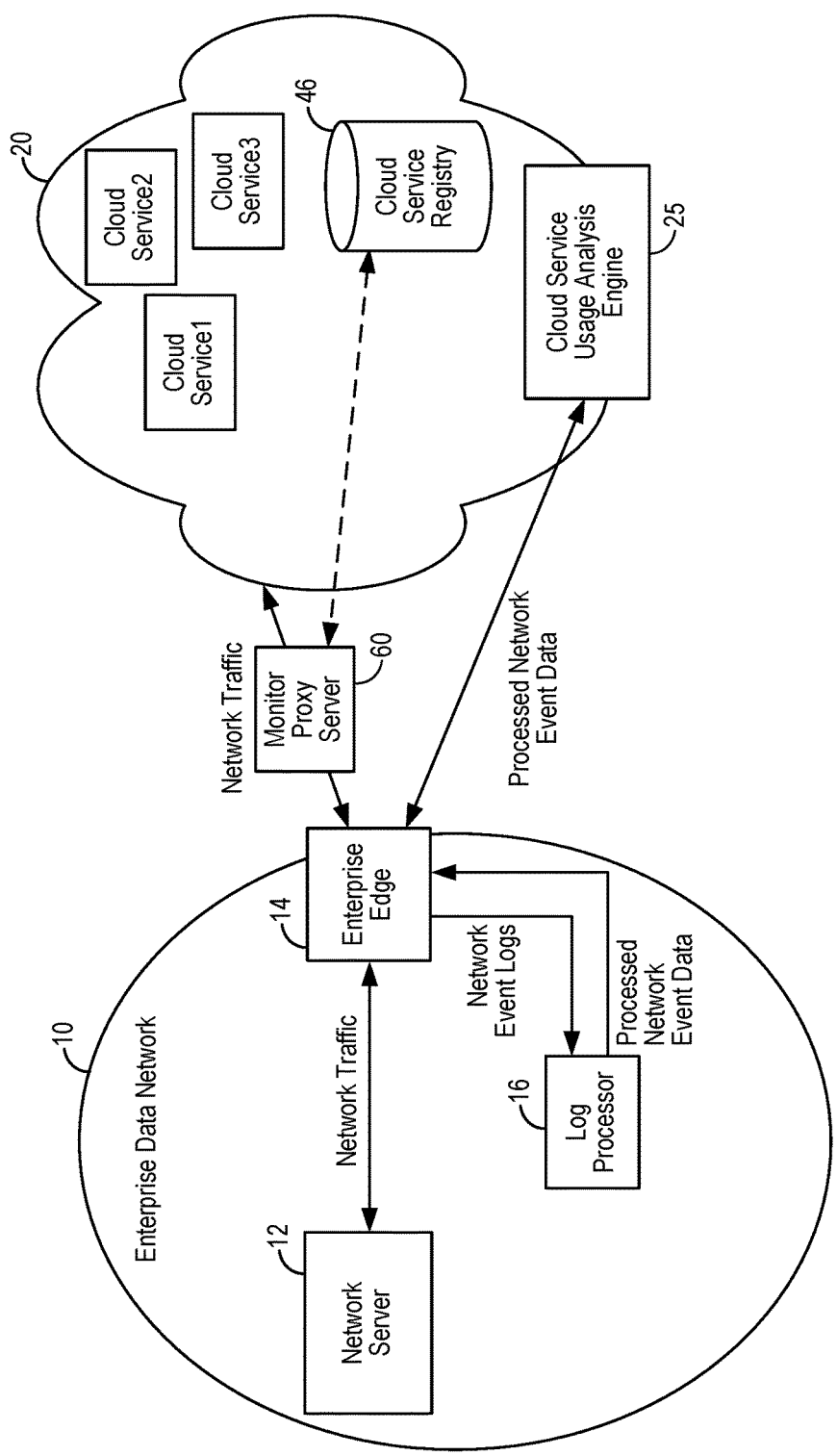
FIG. 7 is a diagram illustrating an environment in which the cloud service usage assessment system of the present invention can be deployed in alternate embodiments.

In some embodiments, an enterprise is configured to have it network traffic redirected through a monitor proxy server 60, as shown in FIG. 7. With all network traffic from the enterprise being routed through the monitor proxy server 60, the monitor proxy server 60 can implement the dynamic IP address classification method to discovery and classify the cloud services IP addresses. The dynamic IP address classification method stores or updates the IP address mapping information in the cloud service registry 46. The log processor 16 can then access the cloud service registry to retrieve all of the IP addresses associated with a specific cloud service provider.

Figure 8:
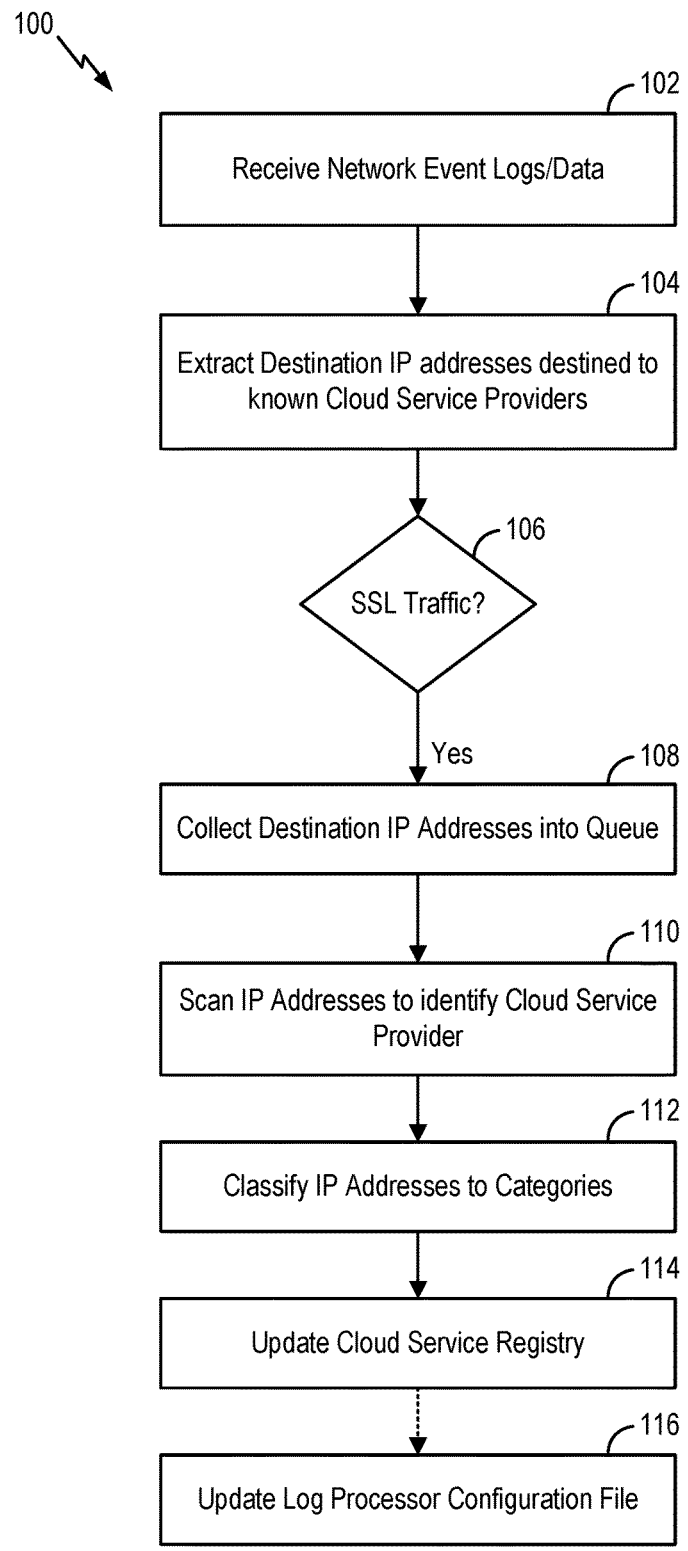
FIG. 8 is a flowchart illustrating a dynamic IP address classification method according to embodiments of the present invention.

FIG. 8 is a flowchart illustrating a dynamic IP address classification method according to embodiments of the present invention. Referring to FIG. 8, a dynamic IP address classification method 100 receives network event logs or data (102). The network event logs can be associated with an enterprise or with multiple enterprises. The method 100 then extracts destination IP addresses from network events that are destined to known cloud service providers (104). In one embodiment, a network event destined for a cloud service provider may be identified by the network event having a CSP (cloud service provider) field set to known cloud service providers. The network event data may include destination IP addresses for different tenants of a cloud service provider.

The method 100 then determines whether the network event uses the SSL (secure socket layer) protocol (106). The method 100 collects destination IP addresses associated with SSL protocol. As a result, the method 100 collects into a queue all destination IP addresses for SSL network traffic bound to cloud service providers (108).

Then, for all unique IP address using SSL in the queue, the method 100 scans and classifies the IP address into a set of categories. More specifically, the method 100 scans each unique IP address in the queue to identify the cloud service provider associated with the IP address (110). In one embodiment, the method 100 scans the certificate associated with the IP address to look for the common name (cname or CN) field. From the "cname" field, the method identifies the cloud service provider to which the IP address is intended. In some embodiments, the dynamic IP address discovery method 100 can use the SSL handshake to discover the common name or CN and the domain of the cloud service provider.

With the common name of the cloud service provider thus discovered, the method 100 then classifies the cloud service provider (112). In one embodiment, the IP addresses are classified into five categories, including:

(1) a public website: the cloud service provider is on the known list maintained in the cloud service registry. In some embodiments, the public website IP addresses form an exclude list which needs to be referenced for lookups.

(2) an existing cloud service providers: the IP address is not a public website but belongs to a known cloud service that is on the known list maintained in the cloud service registry.

(3) a tenant specific cloud service—the domain of the IP address is compared with the tenant's identification to determine whether the IP address belongs to a tenant specific service. For example, for company ABC, the tenant service IP address may be abc.hosting.com, where Hosting.com is the company providing the tenant service to company ABC;

(4) an unknown website—the unknown website will be noted in a list and will be curated so as to be added to the cloud service registry; and (5) unable to connect—in some cases, the virtual machine doesn't allow discovery because of security groups or access restrictions.

With the IP address thus classified, the method 100 may update the cloud service registry 46 (FIG. 2) so that log processor 16 now has the information of the dynamic IP addresses to process network event logs (114). In some embodiments, the method 100 may further update the log processor configuration file (116).

More specifically, after classification, the method 100 takes the following action based on the classification of the IP addresses:

(1) Public website—maintain in the exclude list, the destination IP address is therefore excluded from the processed network event data and will not be used to evaluate the enterprise's cloud service usage;

(2) Existing cloud service provider—update the cloud service registry with the destination IP address for the cloud service provider;

(3) Tenant specific service—update the cloud service registry with the destination IP address for the cloud service provider;

(4) Unknown website—add to the cloud service registry and will be curated; and (5) Unable to connect—in some embodiments; update the log processor configuration file to include in the IP addresses to be probed by the log processor.

The method may further provide APIs for updating cloud service providers and creating private cloud service providers. The APIs may be provided through the data navigation dashboard of the cloud service usage assessment system.

As described above, the method 100 may update the log processor configuration file (116) to include IP addresses that are not able to connect to a probe list. The log processor executes a configuration service to probe the IP addresses in the probe list using the SSL handshake approach and reverse DNS lookup. The method 100 then posts the IP-domain mapping to the log processor configuration service. The log processor configuration service will then update the probe complete list. In some embodiments, the dynamic IP address discovery method 100 will look up the probe complete list and update the classification for the IP addresses based on the log processor probe results.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of assessing a cloud service usage level of an enterprise operating an enterprise data network, the method comprising:

receiving, at an on-premises processor configured within the enterprise data network, network event logs associated with network traffic traveling to and from the enterprise data network, the network event logs comprising network event data describing network events traveling to and from the enterprise data network;

filtering the network event logs to include only network event data relating to the use of cloud-based services;

tokenizing the filtered network event data to remove identifying information relating to the enterprise or to users of the enterprise and to replace the identifying information with random identifiers;

providing the tokenized and filtered network event data as processed network event data;

transmitting the processed network event data to an off-premises usage analysis system configured outside of the enterprise data network;

assessing, using the off-premises usage analysis system, cloud service usage behavior and pattern of the enterprise based on the processed network event data; and generating, using the off-premises usage analysis system, a cloud service usage analytic based on the cloud service usage behavior and pattern of the enterprise, the cloud service usage analytic describing the use of cloud-based services from one or more cloud service providers by the enterprise.

2. The method of claim 1, wherein the network event data comprises a source indicator, a destination indicator, a time of the network event, and a request parameter.

3. The method of claim 1, further comprising:

applying a compression algorithm to the tokenized and filtered network event data; and providing the compressed, tokenized and filtered network event data as the processed network event data.

4. The method of claim 1, wherein filtering the network event logs comprises:

analyzing the network event logs to identify network events related to the use of cloud-based services; and filtering the network event logs based on the analyzing to include only network event data relating to the use of cloud-based services.

5. The method of claim 1, wherein generating, using the off-premises usage analysis system, a cloud service usage analytic comprises:

generating one or more cloud service usage analytics including identification of cloud service providers being used, identities of users using each of the identified cloud service providers, times of usage, the volume of transactions, and the service category of the cloud service providers.

6. The method of claim 1, wherein generating, using the off-premises usage analysis system, a cloud service usage analytic comprises:

generating one or more cloud service usage analytics including a detected number of cloud service providers being used, a detected number of high risk service providers being used, a detected number of users or unique IP addresses using each cloud service, and a detected volume of high risk activities that users of the enterprise engaged in.

7. The method of claim 1, wherein tokenizing the filtered network event data to remove identifying information relating to the enterprise or to users of the enterprise further comprises:

generating an anonymity file comprising a mapping of each identifying information and corresponding random identifier.

8. The method of claim 7, further comprising:

displaying the cloud service usage analytic on a web browser, the cloud service usage analytic including tokenized data;

receiving the anonymity file and storing the anonymity file in a web storage of the web browser; and displaying the identifying information in place of the corresponding random identifier using the mapping in the anonymity file.

9. The method of claim 1, wherein assessing cloud service usage behavior and pattern of the enterprise based on the processed network event data and generating the cloud service usage analytic based on the cloud service usage behavior and pattern of the enterprise comprises:

correlating the processed network event data to unique users as identified by the random identifiers;

correlating, using data from a cloud service registry, the processed network event data to one or more cloud service providers;

analyzing the processed network event data to detect anomaly in the network event data; and generating one or more cloud service usage analytic based the correlated user data and detected anomaly.

10. The method of claim 9, wherein analyzing the processed network event data to detect anomaly in the network event data comprises:

analyzing the processed network event data to detect for unusual activities of a user, or a certain usage pattern, or a large amount of data download by a user of the enterprise.

11. A system for assessing a cloud service usage level of an enterprise operating an enterprise data network, the system comprising:

a log processor deployed within the enterprise data network to receive network event logs associated with network traffic traveling to and from the enterprise data network and to process the network event logs to generate processed network event data containing network event data related to cloud service usage, the network event logs comprising network event data describing network events traveling to and from the enterprise data network, the log processor being configured to filter the network event logs to include only network event data relating to the use of cloud-based services, to tokenize the filtered network event data to remove identifying information relating to the enterprise or to users of the enterprise and to replace the identifying information with random identifiers, and to provide the tokenized and filtered network event data as processed network event data; and a usage analysis system deployed outside of the enterprise data network to receive the processed network event data from the log processor, the usage analysis system being configured to assess cloud service usage behavior and pattern of the enterprise based on the processed network event data and to generate a cloud service usage analytic based on the cloud service usage behavior and pattern of the enterprise, the cloud service usage analytic describing the use of cloud-based services from one or more cloud service providers by the enterprise.

12. The system of claim 11, wherein the network event data comprises a source indicator, a destination indicator, a time of the network event, and a request parameter.

13. The system of claim 11, wherein the log processor is further configured to apply a compression algorithm to the tokenized and filtered network event data, and to provide the compressed, tokenized and filtered network event data as the processed network event data.

14. The system of claim 11, wherein the log processor is configured to analyze the network event logs to identify network events related to the use of cloud-based services and to filter the network event logs based on the analyzing to include only network event data relating to the use of cloud-based services.

15. The system of claim 11, wherein the log processor is configured to generate an anonymity file comprising a mapping of each identifying information and corresponding random identifier.

16. The system of claim 11, wherein the usage analysis system is configured to generate one or more cloud service usage analytics including identification of cloud service providers being used, identities of users using each of the identified cloud service providers, times of usage, the volume of transactions, and the service category of the cloud service providers.

17. The system of claim 11, wherein the usage analysis system is configured to generate one or more cloud service usage analytics including a detected number of cloud service providers being used, a detected number of high risk service providers being used, a detected number of users or unique IP addresses using each cloud service, and a detected volume of high risk activities that users of the enterprise engaged in.

18. The system of claim 11, wherein the usage analysis system is configured to correlate the processed network event data to unique users as identified by the random identifiers, to correlating, using data from a cloud service registry, the processed network event data to one or more cloud service providers, to analyze the processed network event data to detect anomaly in the network event data, and to generate one or more cloud service usage analytic based the correlated user data and detected anomaly.

19. The system of claim 18, wherein the usage analysis system is further configured to analyze the processed network event data to detect for unusual activities of a user, or a certain usage pattern, or a large amount of data download by a user of the enterprise.

\* \* \* \* \*